(12) United States Patent
Eckhardt et al.

(10) Patent No.: US 8,534,259 B2
(45) Date of Patent: Sep. 17, 2013

(54) ROTARY PISTON INTERNAL COMBUSTION ENGINE

(75) Inventors: Dietrich Eckhardt, Aichwald (DE); Huschmand Sabet, Stuttgart (DE)

(73) Assignee: Reyhani Design United Services GmbH, Hrdejovice (CZ)

( * ) Notice: Subject to any disclaimer, the term of this patent is extended or adjusted under 35 U.S.C. 154(b) by 915 days.

(21) Appl. No.: 12/311,566

(22) PCT Filed: Sep. 25, 2007

(86) PCT No.: PCT/EP2007/060152
§ 371 (c)(1),
(2), (4) Date: Sep. 25, 2009

(87) PCT Pub. No.: WO2008/043664
PCT Pub. Date: Apr. 17, 2008

(65) Prior Publication Data
US 2010/0024765 A1     Feb. 4, 2010

(30) Foreign Application Priority Data
Oct. 6, 2006  (DE) .......................... 10 2006 047 249

(51) Int. Cl.
F02B 53/00    (2006.01)
(52) U.S. Cl.
USPC ........... 123/245; 123/212; 123/214; 123/230; 123/231; 123/43 B
(58) Field of Classification Search
USPC ................ 123/200, 205, 207–212, 214, 218, 123/223, 227, 234, 230, 231, 241, 242, 243, 123/245, 18 R, 18 A, 43 R, 44 R, 44 D, 43 B; 418/33, 34, 35, 36, 37, 68, 160, 161, 164, 418/165, 166, 168
See application file for complete search history.

(56) References Cited

U.S. PATENT DOCUMENTS 3,736,080 A     5/1973  Sabet
3,933,131 A  *  1/1976  Smith .............................. 418/37
(Continued)

FOREIGN PATENT DOCUMENTS

DE     42 18 885    12/1992
EP     0 711 379     5/1996
(Continued)

OTHER PUBLICATIONS

International Search Report for PCT/EP2007/060152, mail date Dec. 13, 2007.

*Primary Examiner* — Mary A Davis
(74) *Attorney, Agent, or Firm* — Collard & Roe, P.C.

(57) ABSTRACT

A central-axis rotary piston internal combustion engine has a rotor housing closed off by housing covers, has an outer rotor which rotates in the rotor housing with uniform speed, and has an inner rotor which rotates in the interior of the outer rotor with non-uniform speed. The outer rotor has three inwardly pointing pistons rigidly connected to one another and arranged at uniform angular intervals from one another. The inner rotor has a corresponding number of radially outwardly pointing mating pistons which are rigidly connected to one another and which engage between in each case two pistons of the outer rotor so as to delimit in each case two working chambers. Each working chamber is assigned a combustion chamber and each combustion chamber communicates via a control window with stationary inlet and outlet openings.

20 Claims, 10 Drawing Sheets

(56) References Cited

U.S. PATENT DOCUMENTS

Figure 1:
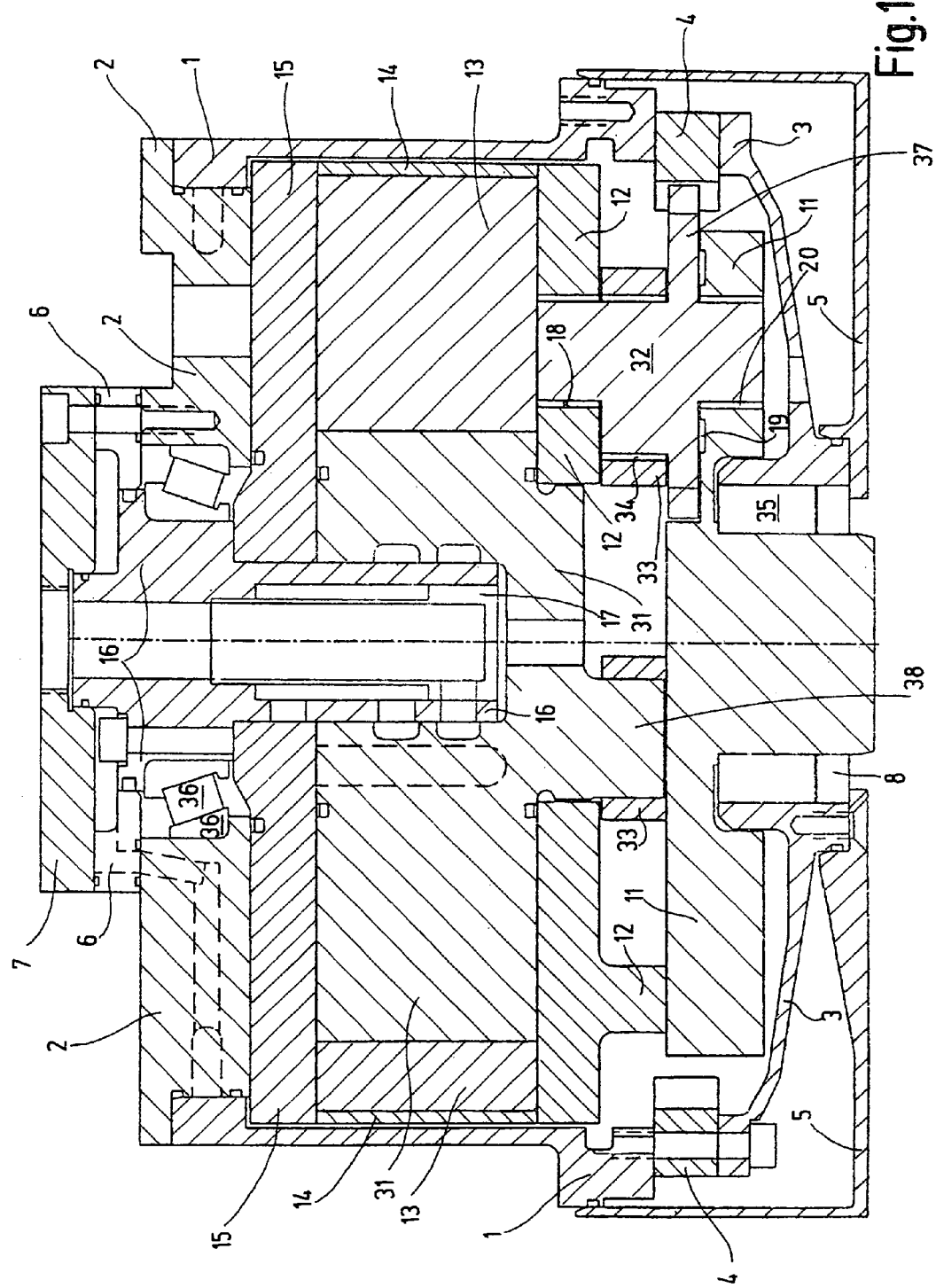

| | | | | |
|---|---|---|---|---|
| 4,009,691 | A | * | 3/1977 | Sabet .......................... 123/245 |
| 4,370,109 | A | | 1/1983 | Sabet et al. |
| 4,455,128 | A | * | 6/1984 | Seybold ........................ 418/34 |
| 4,664,078 | A | * | 5/1987 | Bender ........................ 123/245 |
| 5,133,317 | A | | 7/1992 | Sakita |
| 5,324,182 | A | * | 6/1994 | Sabet et al. .................... 418/34 |
| 5,501,182 | A | | 3/1996 | Kull et al. |
| 5,722,361 | A | | 3/1998 | Sabet et al. |
| 2005/0142250 | A1 | * | 6/2005 | Garwood ........................ 426/35 |
| 2007/0157899 | A1 | * | 7/2007 | Seufert et al. ............ 123/179.25 |

FOREIGN PATENT DOCUMENTS

| | | |
|---|---|---|
| GB | 965 956 | 8/1964 |
| GB | 2 262 965 | 7/1993 |
| WO | WO 95/34750 | 12/1995 |
| WO | WO 01/81729 | 11/2001 |

* cited by examiner

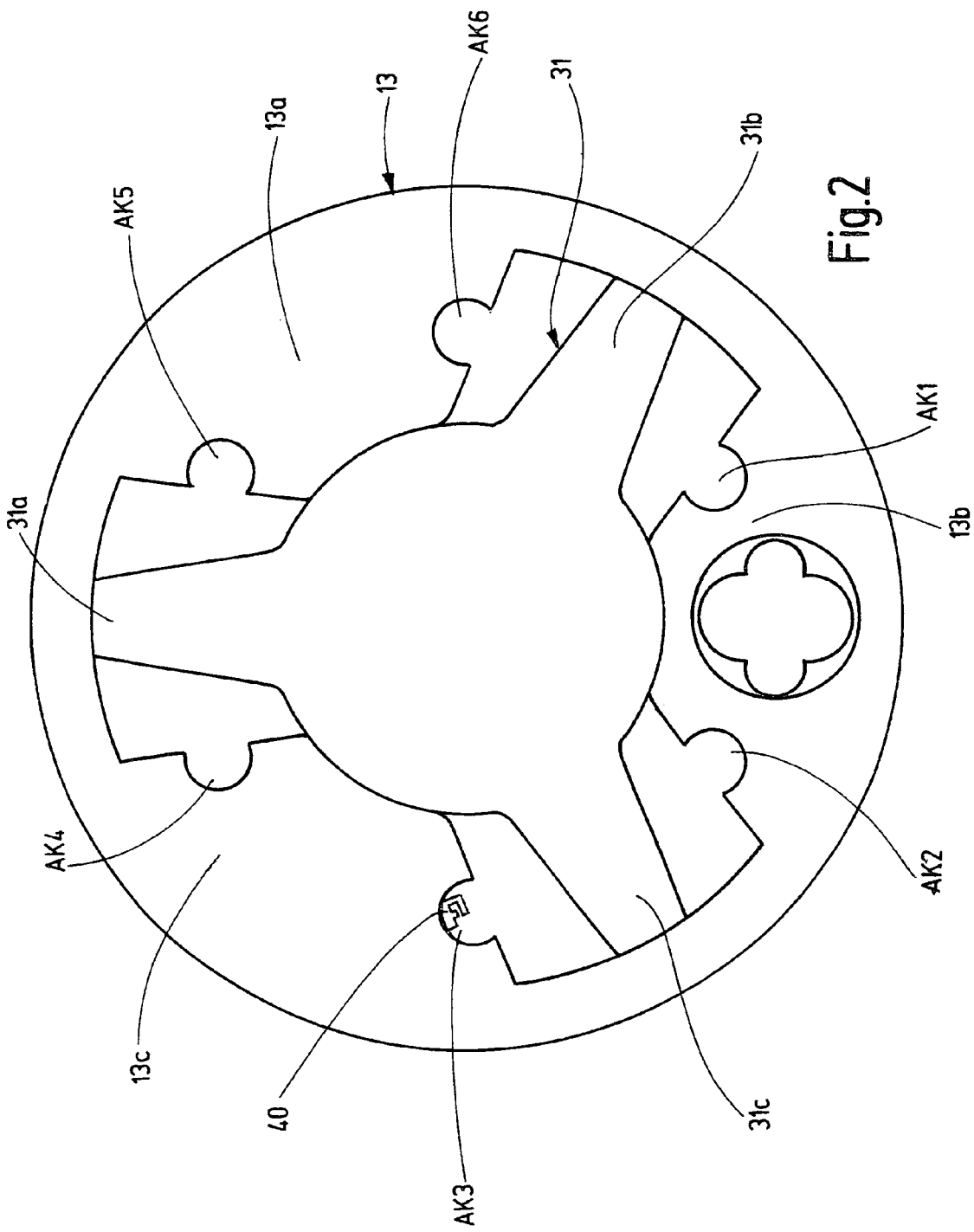

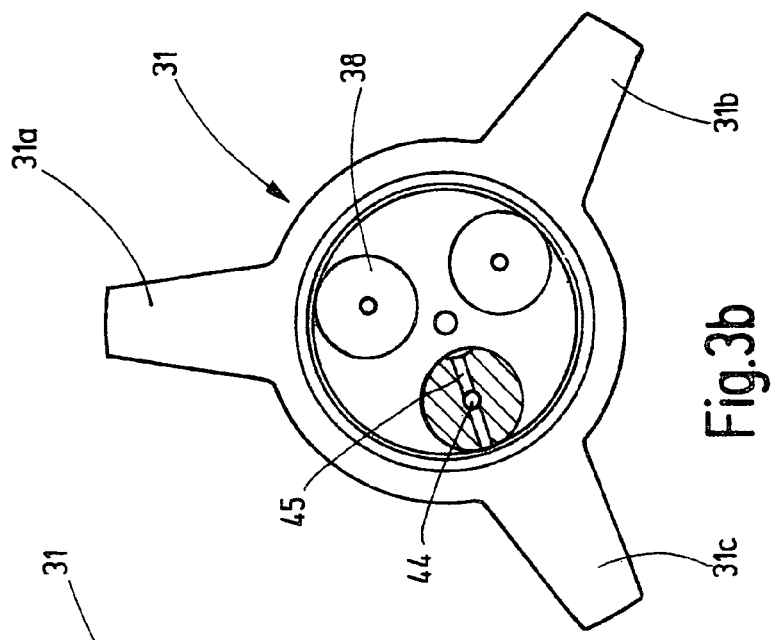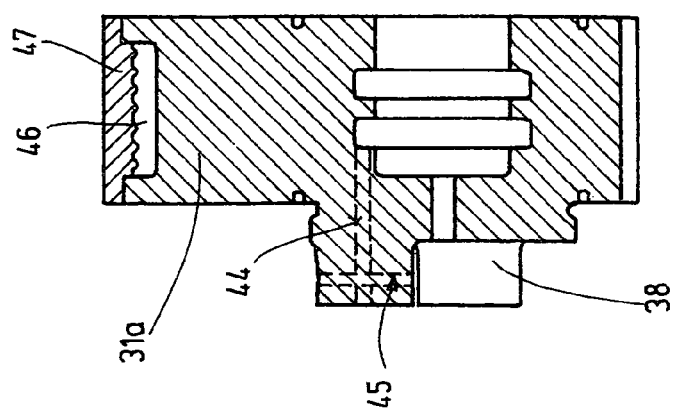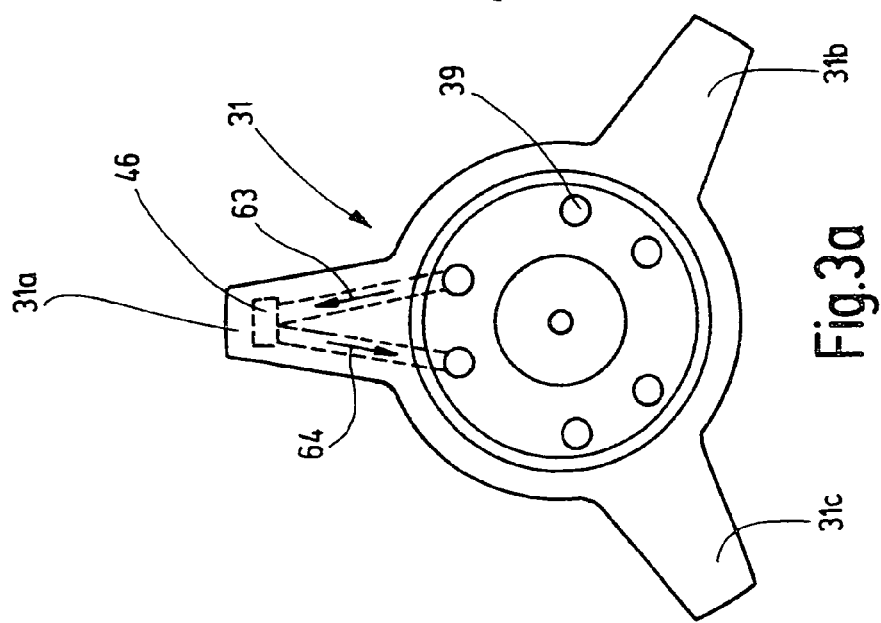

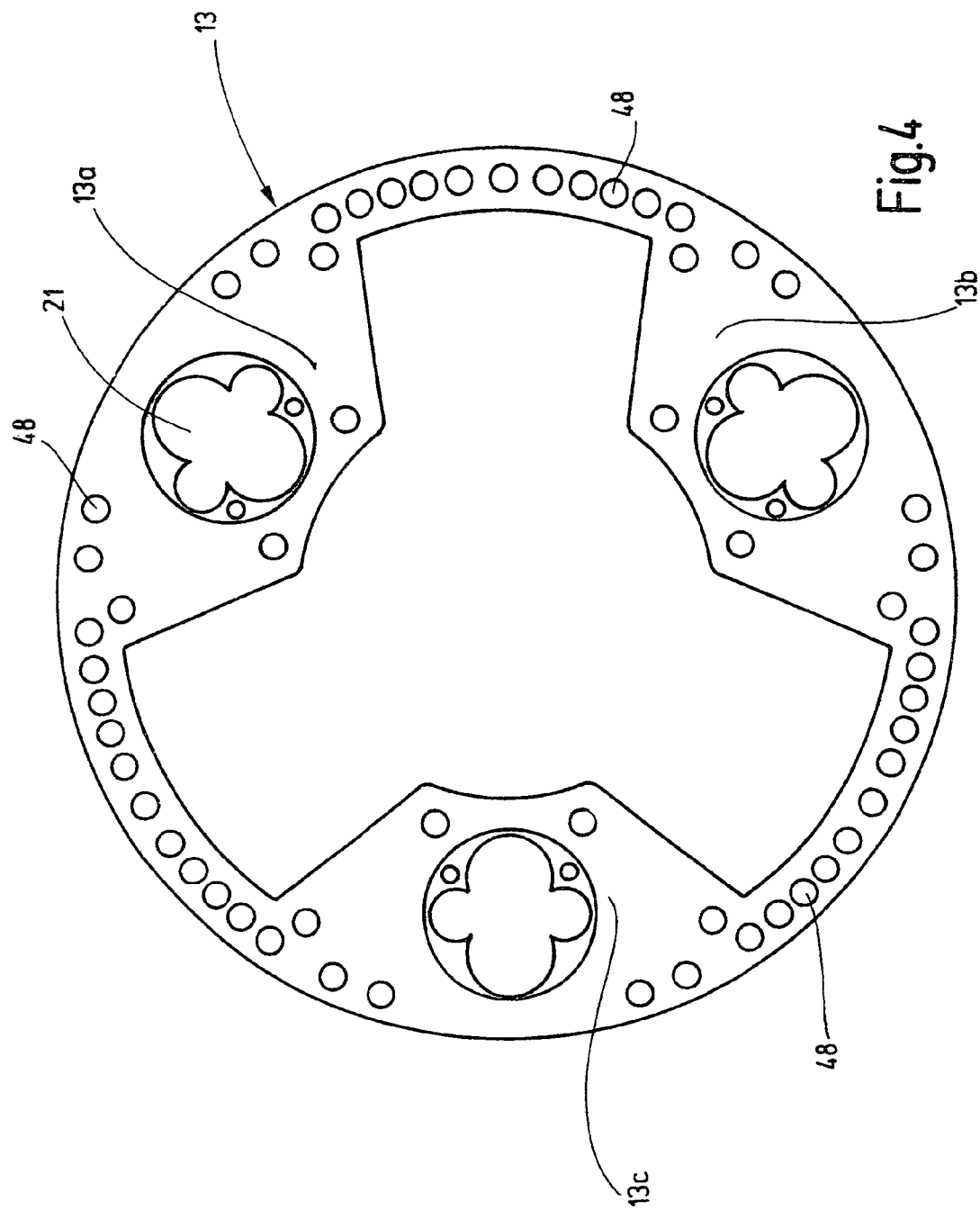

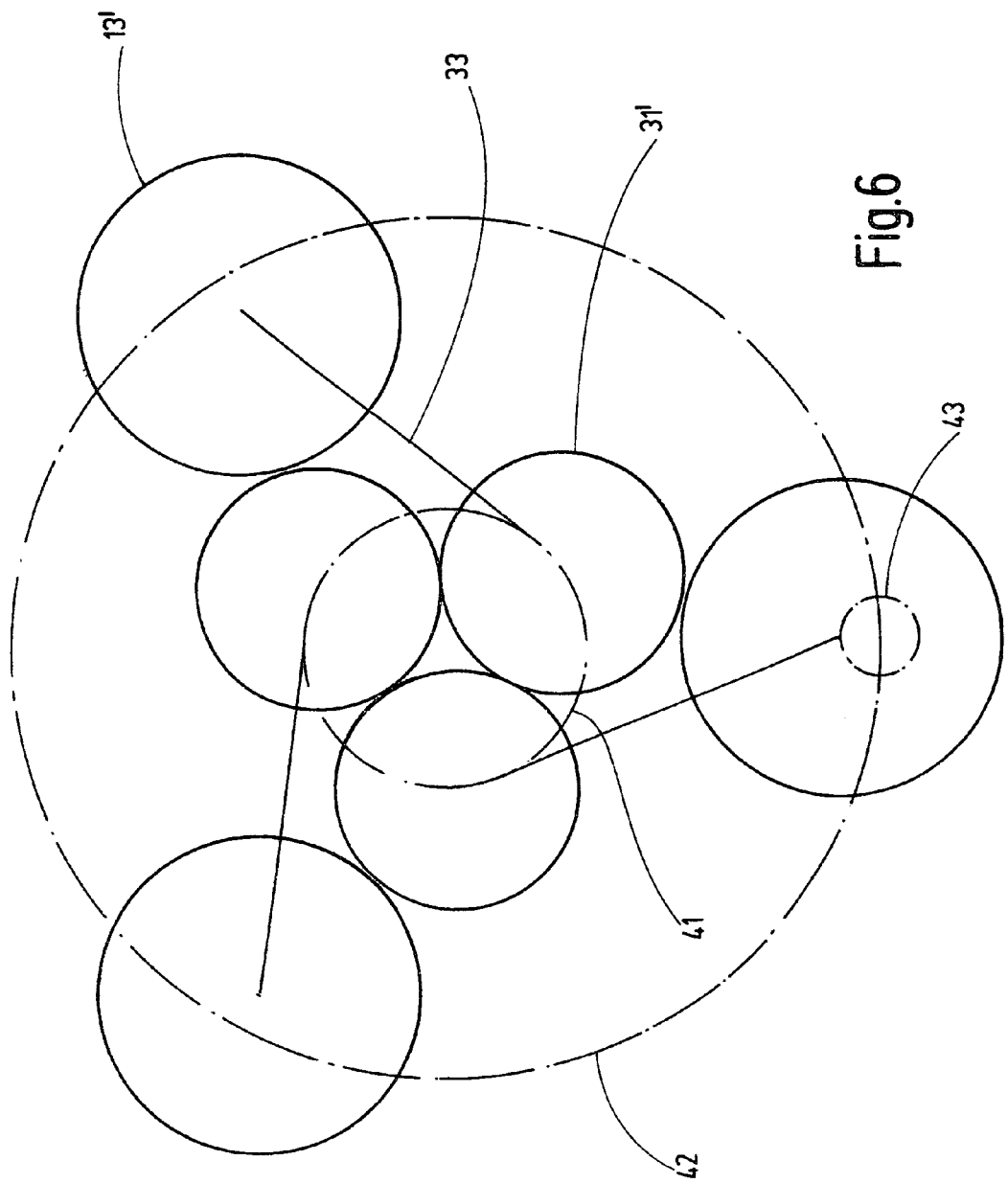

ROTARY PISTON INTERNAL COMBUSTION ENGINE

CROSS REFERENCE TO RELATED APPLICATIONS

This application is the National Stage of PCT/EP2007/060152 filed on Sep. 25, 2007, which claims priority under 35 U.S.C. §119 of German Application No. 10 2006 047 249.7 filed on Oct. 6, 2006. The international application under PCT article 21(2) was not published in English.

The invention relates to a central-axis rotary piston internal combustion engine having a round cylindrical rotor housing which is closed off by a housing cover on the output side and a housing cover on the side opposite the output side, an external rotor which rotates at uniform speed in the rotor housing about its central axis and which supports a rotor cover on the output side and a rotor cover on the side opposite the output side, and an internal rotor which rotates at non-uniform speed in the interior of the external rotor about the central axis, wherein the external rotor has a plurality of radially inwardly pointing pistons which are rigidly connected to one another, and the internal rotor has a corresponding number of radially outwardly pointing opposing pistons which are rigidly connected to one another and engage between, in each case, two pistons of the external rotor so as to delimit two working chambers in each case, and wherein each working chamber is assigned a combustion chamber, and each combustion chamber communicates via a control window with fixed inlet openings and outlet openings.

A internal combustion engine of this type is known, for example, from EP 07 11 379 B1. This internal combustion engine, which is also known as a Sabet engine, has a satisfactory high pressure operating mode with low frictional and charge losses and a sealing system of simple design. The engine in said document has four pistons and four opposing pistons as well as four connecting rods which transmit torque from the internal rotor to the external rotor. In this design, high precision is necessary during the manufacture and mounting since even with only small deviations in dimensions in the region of the connecting rods free true running is not readily assured and self-locking can occur. Furthermore, this engine has an overall large length of sealing elements which contribute to frictional losses and gas leakages.

Taking this as a basis, the object of the invention is primarily to develop an internal combustion engine of the type mentioned at the beginning in such a way that a high degree of efficiency is achieved and the production costs are lowered.

The combinations of features of a central-axis rotary piston internal combustion engine as described herein are proposed for achieving this object. Advantageous embodiments and developments of the engine are also described herein. A working method for operating the engine is also described herein.

The invention is based above all on the idea that optimized configuration of a combustion chamber and the shortest possible length of the sealing elements contribute to improving the efficiency. According to the invention, this is achieved above all by virtue of the fact that the external rotor has three pistons which are arranged at equal angular intervals from one another. Correspondingly, the internal rotor has three opposing pistons. Compared to an internal combustion engine with, in each case, four pistons and opposing pistons, the combustion chambers of the machine according to the invention have a thermodynamically more favorable ratio of the surface to the volume, and the overall length of the elements which seals the combustion chambers is less so that gas leakages and frictional losses are reduced. In one preferred embodiment, good running properties of the internal combustion engine are achieved in particular if geometric correspondence is avoided in terms of the transmission of torque from the internal rotor to the external rotor. For this purpose, three connecting rod journals, on which three connecting rods which are connected by their other ends to the external rotor via eccentric shafts are mounted, are advantageously provided on the internal rotor. This provides complete support of the internal rotor without causing correspondence in this context. It is kinematically favorable if the centers of the connecting rod journals are arranged at a distance from the central plane of the opposing pistons.

In one preferred embodiment of the invention, the connecting rod journals are embodied in one piece with the internal rotor, which is advantageously composed of lightweight metal, in particular of an aluminum alloy. Connecting rods are usually mounted on steel journals or steel bolts. However, they would have to be fitted into the lightweight material of the internal rotor, which could lead to damage to the less resistant lightweight metal rotor owing to different thermal coefficients of expansion of the materials.

In order to transmit the rotational movement of the internal rotor to the external rotor, an internal toothed gear, with which planet gears which are arranged on the eccentric shafts are in intermeshing engagement, are arranged on the rotor housing. As the internal rotor rotates, the eccentric shafts are made to undergo a rotational movement by the connecting rods, and they transmit said rotational movement to the external rotor with the transmission ratio of the planet gears with respect to the internal toothed gear. In one preferred embodiment of the invention, the ratio of the number of teeth is 1:3. It is basically possible to use a combination of planet gears and sun gear instead of the combination of planet gears and internal toothed gear, in which the sun gear is then arranged, for example, on the housing cover on the output side. Furthermore, it is advantageous if the planet gears are embodied in one piece with the eccentric shafts.

In one advantageous embodiment of the invention, each combustion chamber is assigned a sparkplug which is preferably arranged centrally in its associated combustion chamber. The particular advantage of this arrangement is that the sparkplug can be arranged centrally in its combustion chamber, as a result of which better combustion of the mixture and therefore an increase in efficiency are brought about. A further advantage of this type of embodiment is that a parameter-dependent ignition curve can be provided, i.e. the ignition time can be varied as a function, for example, of the rotational speed, the load, the temperature and/or the type of fuel and quality of fuel. The sparkplugs here may be supplied with electrical energy by means of a spark gap which extends from the rotor housing to the external rotor. For this purpose, an electrically insulated electrode, which is connected to the ignition cable, is arranged in the rotor housing. The external rotor is expediently provided with an insulating coating which prevents flashovers onto the external rotor of the ignition voltage in the range of 25 kV. Only the high voltage connections of the sparkplugs pass through this insulating layer centrally.

Alternatively it is also possible to arrange, in the housing cover, a sparkplug which is responsible for igniting the mixture in all the combustion chambers. The arrangement of the sparkplugs in the edge region of the combustion chamber results in a correspondingly large distance for the flame front so that in this case the combustion is not as good as with a central arrangement. Furthermore, one is tied to a geometrically predefined ignition region. However, this embodiment results in less structural expenditure, which may be preferable for certain applications.

If direct petrol injection is selected, a single injection nozzle in the housing cover can supply fuel to all the combustion chambers.

In order to ensure sufficient load bearing capacity of the transmission of force between the internal rotor and the external rotor which is carried out by means of the connecting rods, in particular if the connecting rod journals on the internal rotor are composed, in a single piece with the latter, of a lightweight metal alloy which has a lower strength value than, for example, steel, the connecting rod journals and the small connecting rod eyes of the connecting rods are to have a diameter which is as large as possible in order to provide a large and effective bearing face. In this context, the diameter is limited by the necessary free access between adjacent connecting rods or bearing eyes as the rotors rotate. Furthermore, it has become apparent that it is advantageous if the ratio of the radii of the geometric locations of the centers of the planet gears and of the small connecting rod eyes of the connecting rods as the rotors rotate is in the range from 2.5:1 to 3.5:1, and is preferably approximately 3.0:1.

In a further or alternative embodiment of the invention, at least one oil pump, which is embodied as a gearwheel pump and whose drive gearwheel is connected to the eccentric shaft, is provided in the external rotor. A separate oil pump housing can therefore be dispensed with. Such an oil pump is preferably provided in each of the three pistons, as a result of which the delivery volume for lubrication purposes and cooling purposes is increased and all three pistons are cooled intensively, as it were, by the oil which is forcibly circulating in the oil pumps. With this Sabet engine with three pistons, the advantageous arrangement of the oil pumps in the region of the eccentric shafts is possible by virtue of the existing installation space. In an engine with four pistons, there is not sufficient space for such a solution in the region of the eccentric shafts.

A further preferred or alternative embodiment of the invention provides an essentially annular oil collecting trough for lubricating and/or cooling oil which is arranged coaxially with respect to the central axis of the rotors. The internal combustion engine is therefore configured for an operating mode in which the central axis of the rotors is aligned essentially vertically and the rotors rotate in a horizontal plane.

Gasoline or diesel, ethanol and gases such as hydrogen, natural gas, LPG and the like are possible as operating materials. The use of hydrogen as fuel is of particular interest. A hydrogen/air mixture is theoretically capable of ignition up to an air ratio of approximately 10:1. This also permits a change in load in a hydrogen motor by regulating the quality with similarly high internal efficiency levels to those in diesel engines. This advantage applies to reciprocating piston engines and rotary piston engines to the same degree. However, there are significant differences in the ignition and combustion of hydrogen/air mixtures. It is advantageous in terms of the undesired auto-ignition of the mixture in the combustion chamber that the charge change in a Sabet engine according to the invention is controlled by slits, while in a four-stroke reciprocating piston engine it is controlled by valves. As a result, the generation of excessively hot regions, referred to as hot spots, is largely avoided in the combustion chamber of the Sabet engine, and said engine can be operated with a smaller air ratio, that is to say higher specific output, at full load than a corresponding reciprocating piston engine. The burning speed is higher in hydrogen/air mixtures under the same peripheral conditions than in petrol/air mixtures, as a result of which hydrogen engines produce louder combustion noise than petrol engines. However, the engine noise of a Sabet engine, which is in any case low, does not increase to the same extent when it is in hydrogen mode than is be the case for a corresponding reciprocating piston engine owing to the lower temperature of the combustion gases therein.

One preferred use of the internal combustion engine is the use as a generator drive in a hybrid engine for motor vehicles. The internal combustion engine here can advantageously be operated with an approximately constant rotational speed in order to charge accumulators, while the vehicle drive is operated exclusively via one or more of these supplied electric motors.

A further preferred use of the Sabet engine is the use as a drive for mobile or decentralized fixed installations for generating power, heat/cold and mechanical or hydraulic energy for operating work machines such as, for example, pumps, conveying systems, lifting systems and machine tools. The multi-fuel operation capability of the Sabet engine, that is to say the possibility of operating with liquid or gaseous petroleum derivatives, with fuels generated from renewable biomass or with hydrogen, is a particular advantage here.

Figure 7:
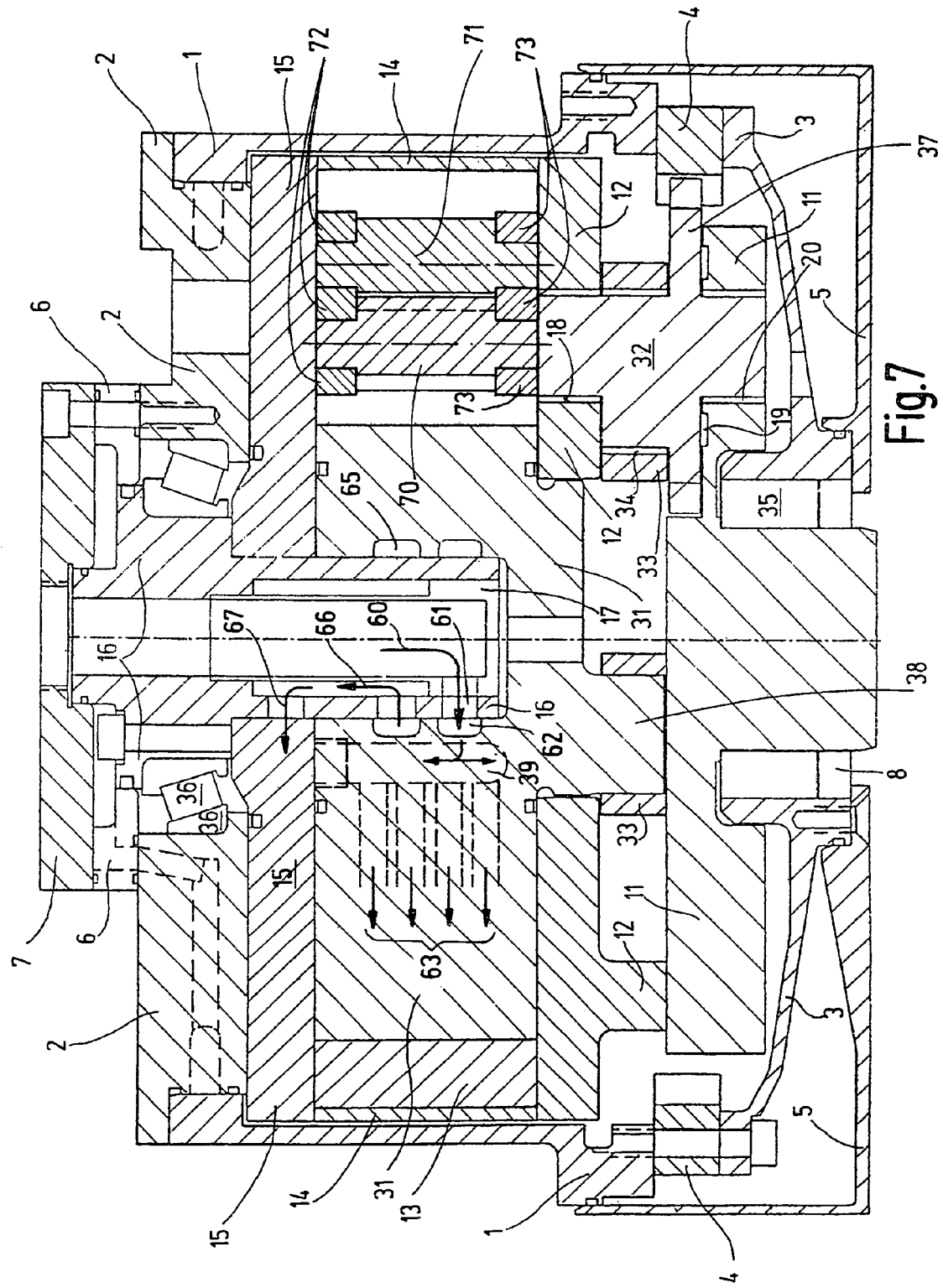

The invention will be explained in more detail below on the basis of exemplary embodiments which are illustrated schematically in the drawing, in which FIG. 1 shows a longitudinal section through an exemplary embodiment of the internal combustion engine according to the invention, FIG. 2 shows a schematic view of the external rotors and internal rotors of the internal combustion engine according to FIG. 1, FIGS. 3a to c show front views and rear views as well as a cross-sectional view through the internal rotor according to FIG. 2, FIG. 4 shows a front view of the external rotor according to FIG. 2 with oil pump recesses which are provided in the pistons, FIGS. 5a to h are a schematic illustration of the 6 stroke method which is used in the machine according to FIGS. 1 to 4, FIG. 6 is a schematic view of the size ratios of the small and large connecting rod eyes and of the geometric location of their center point during rotation, and FIG. 7 shows a simplified longitudinal section according to FIG. 1, with an oil pump arranged in a piston and a partial illustration of the cooling oil circulation.

The rotary-piston internal combustion engine illustrated in the drawing is a Sabet engine with axial exchange of charge and in each case three pistons and opposing pistons. The engine is configured for operation with a stationary shaft, in which the shaft is oriented vertically and the pistons and opposing pistons circulate in a horizontal plane. Such an arrangement is used, for example, in boat engines or ancillary engines for generating power, which engines can have an output of approximately 20-30 kW.

The internal combustion engine illustrated in longitudinal section in FIG. 1 is composed of fixed and rotating assemblies, in which the fixed assembly comprises essentially a housing 1 with an upper housing cover 2 on the side opposite the output side, and a lower housing cover 3, an internal toothed gear 4 which is connected to the housing and an oil trough 5 which is attached to the lower housing cover 3. Furthermore, the fixed assembly includes an oil distributor disk 6, an assigned cover 7 with an oil supply and a shaft sealing ring 8.

The assembly which rotates together with an output 11 is composed essentially of a lower rotor cover 12, an external rotor 13, an insulating layer 14, an upper rotor cover 15, a bearing flange 16, a pressed-in insert 17 for distributing oil, an internal bearing bushing 18, a thrust disk 19 and an external bearing bushing 20.

Furthermore, the internal combustion engine has an internal rotor 31, three eccentric shafts 32 which are mounted in the internal and external bearing bushings 18, 20, associated connecting rods 33 which are mounted on the eccentric shafts 32 by means of bearing bushes 34, and cylinder roller bearings 35 and beveled roller bearings 36 for supporting the assembly, which rotates with the output 11, in the lower housing cover 3 and upper housing cover 2. Planet gears 37 are embodied in one piece with the eccentric shafts 32 and are in intermeshing engagement with the internal toothing system of the internal toothed gear 4.

FIG. 2 shows a schematic view of the external rotors 13 and internal rotors 31. The working spaces, in which the opposing pistons 31a-c which protrude from the internal rotor 31 toward the outside in the manner of a wing, are located between the pistons 13a-c of the external rotor 13. In the opposing engagement region of the pistons and opposing pistons, a total of six working spaces AK1 to AK6 are formed, the volume of which is decreased and increased periodically by the to and fro pivoting of the opposing pistons. At the end sides, the working spaces are bounded by the rotor covers 12, 15 which are illustrated in FIG. 1 and are permanently connected to the external rotor 13. The upper rotor cover 15 contains control openings for the charge cycle, the position and function of which control openings are explained in more detail with reference to FIGS. 5a to 5h. Each working space is assigned a partially cylindrical combustion chamber which adjoins it laterally, in each of which combustion chambers a spark plug 40 (illustrated here only for AK3). Since it is not possible to use conventional ignition cables to supply voltage to the spark plugs which rotate with the external rotor 31, the supply is provided via a spark gap. For this purpose, an electrode (not illustrated in more detail) which is connected to an ignition cable is arranged in the rotor housing. The insulation layer 14 on the external rotor 13 prevents flashing over of the ignition voltage to the external rotor. Gasoline or diesel, ethanol and gases such as hydrogen, natural gas, LPG and the like are possible as operating materials.

The relative movement between the internal rotor 31 and the external rotor 13 is provided via the planet gears 37 which are arranged on the eccentric shafts 32 or embodied in one piece therewith and intermesh with the internal toothed gear 4.

As the internal rotor 31 rotates, the connecting rods 33 cause the eccentric shafts 32 to undergo a rotational movement owing to the eccentric bearing of said connecting rods 33 on said eccentric shafts 32, and the external rotor 13 is driven by the output 11 via the planet gears 37 and the internal toothed gear 4.

In FIG. 3, the internal rotor 31 is illustrated with the opposing pistons 31a-c which project outwards in the manner of a wing, in a front view and rear view as well as in cross section. The internal rotor has six bores 39 which are supplied with cooling oil by the oil circuit. Longitudinal bores 44 and transverse bores 44, 45 conduct lubrication oil to the bearing points on the connecting rod journals 38 for the connecting rods 33. From FIG. 3c it is apparent that in the region of those external parts of the opposing pistons 31a-c which are subject to high thermal stressing, a cooling pocket 46 which is integrated into the oil circuit is also formed. For fabrication reasons, the opposing piston therefore has a chamfer which forms the cooling pocket 46, and a piston lid 47 which covers said chamfer. FIG. 3a also exhibits ducts 63 and 64 which lead toward the cooling pocket 46 and away from it. In each case four of these ducts are arranged parallel to one another. The cooling oil stream in this region will be explained in more detail with reference to FIG. 7.

FIG. 4 shows a front view of external rotor 13 with recesses 21 in the pistons 13a-c which are intended for gearwheel oil pumps. The recesses 21 are in the shape of four overlapping circles, wherein the larger circles which are arranged in rows in the radial direction form the space for the gearwheels of the pump, while the smaller circles which are arranged in rows in the circumferential direction form the spaces for the inflow and outflow of the oil. The drive gearwheels, arranged radially on the inside cover of the oil pumps are arranged directly on the eccentric shafts 32, specifically on their non-eccentric part which is mounted in the lower rotor cover 3, with the result that a separate oil pump housing and a separate oil pump drive are not necessary. In order to build up sufficient oil pressure when the internal combustion engine is put into operation, an external, electric oil pump (not illustrated) is additionally provided.

As the engine rotates, the electric oil pump feeds the oil, which has been branched off for lubricating and cooling the sliding variant, from the oil trough 5 back into the otherwise closed oil circuit. The oil pressure which is necessary for lubrication is built up by the electric oil pump. The gearwheel oil pumps in the pistons 13a-c are configured for a significantly larger oil throughput and they compensate for the pressure loss as the cooling oil circulates. Further customary oil circuit components such as an oil cooler and an oil filter are likewise not illustrated in more detail. FIG. 4 also shows a plurality of bores 48, distributed mainly over the circumference of the external rotor 13, for cooling oil.

The functional principle of the internal combustion engine which operates according to a 6-stroke method is explained in more detail with reference to the series of FIGS. 5a to 5h and the table below. In addition to the strokes, that is to say induction, compression, work and expulsion, which are known from the 4-stroke principle, here there is additionally charging of the an accumulator with air or mixture (f, charge accumulator at the bottom of the table), a second induction stroke and feeding of the compressed air or of the compressed mixture from the accumulator into a working chamber at the start of the compression stroke (a, recharging and/or charging of the working chamber from the accumulator at the bottom of the table). The internal combustion engine therefore has, as it were, an integrated compressor. However, additional charging by an external compressor or turbocharger is also possible. In contrast to charging by means of external assemblies, the internal charging is also referred to as recharging.

Eight positions at an interval of, in each case, 15° rotational angle at the output 11, corresponding, in each case, to 45° angle of the three eccentric shafts 32 relative to the external rotor, are illustrated. The control openings on the underside of the upper housing cover 2 are referred to as follows: A is the outlet which is split by a web in the flange (upper side of the cover) into the two ducts A1 and A2, which can be combined again downstream. If A1 opens, a pressure surge will not pass directly to A2 because of the overlap with the working chamber running ahead. E1 is a first inlet for air or mixture, AS is an outlet to an accumulator, E2 is a second inlet for air or mixture and ES is an inlet from the accumulator. The accumulator is a connecting duct between the control openings AS and ES. Its volume is a multiple, for example 5 to 20 times, the stroke volume of an individual working chamber. AK1 to AK6 are the six working chambers in the external rotor 13 which project into the upper rotor cover 15 and have on its upper side the circular contour shown, with an angular interval of, in each case, 60°. This angular interval is based on the dead center intervals of, in each case, 60° selected here. In general cases, the two dead center intervals are different and their sum is 120°. The angular interval between the control openings on the upper side of the upper rotor cover is then alternately 60°–x and 60°–x. The recesses in the upper rotor cover form the combustion chamber to a considerable extent.

The associated processes in the working chambers result from the following table:

| Fig. | Angle | Working chamber | | | | | |
|---|---|---|---|---|---|---|---|
| | | AK1 | AK2 | AK3 | AK4 | AK5 | AK6 |
| 5a | 0° | a | b | c | d | e | f |
| 5b | 15° | a | g | h | i | j | i |
| 5c | 30° | j | k | h | l | f | l |
| 5d | 45° | m | k | h | l | f | e |
| 5e | 60° | b | c | d | e | f | a |
| 5f | 75° | g | h | i | j | i | a |
| 5g | 90° | k | h | l | f | l | j |
| 5h | 105° | k | h | l | f | e | m |

Where the meaning of symbols is as follows:
a Supercharging of the AK from the accumulator
b Combustion
c Outlet opens
d Outlet closes
e Inlet closes
f Charge accumulator
g Combustion, expansion
h Expulsion
i Inlet opens
j Compression
k Expansion
l Induction
m Ignition The scheme can be continued as desired taking into account the symmetry in the three-blade engine. This involves returning to FIG. 5a after 5h and increasing the number of the working chambers AK by 2. Consequently, FIGS. 5a to 5h and the table for the rotational angle range of the output from 120° to 225° apply if AK1 is replaced by AK3, AK2 by AK4, AK3 by AK5, AK4 by AK6, AK5 by AK1 and AK6 by AK2.

The sequence of strokes for, for example, the working chamber AK1 for one full revolution of the external rotor 13 and output 11 of 360° can be read off from the table by firstly following the column associated with AK1 from top to bottom, then the column associated with AK3 and finally the column associated with AK5.

In particular, the following then occurs (all the degree values given in the table relate to the external rotor rotational angle): both the internal rotor 31 and the external rotor 13 move in the clockwise direction. While the external rotor 13 rotates uniformly, the opposing pistons 31a-c of the internal rotor 31 "oscillate" to and fro three times between the adjacent pistons 13a-c of the external rotor 13 during one full revolution, that is to say carry out six strokes.

Figure 5A:
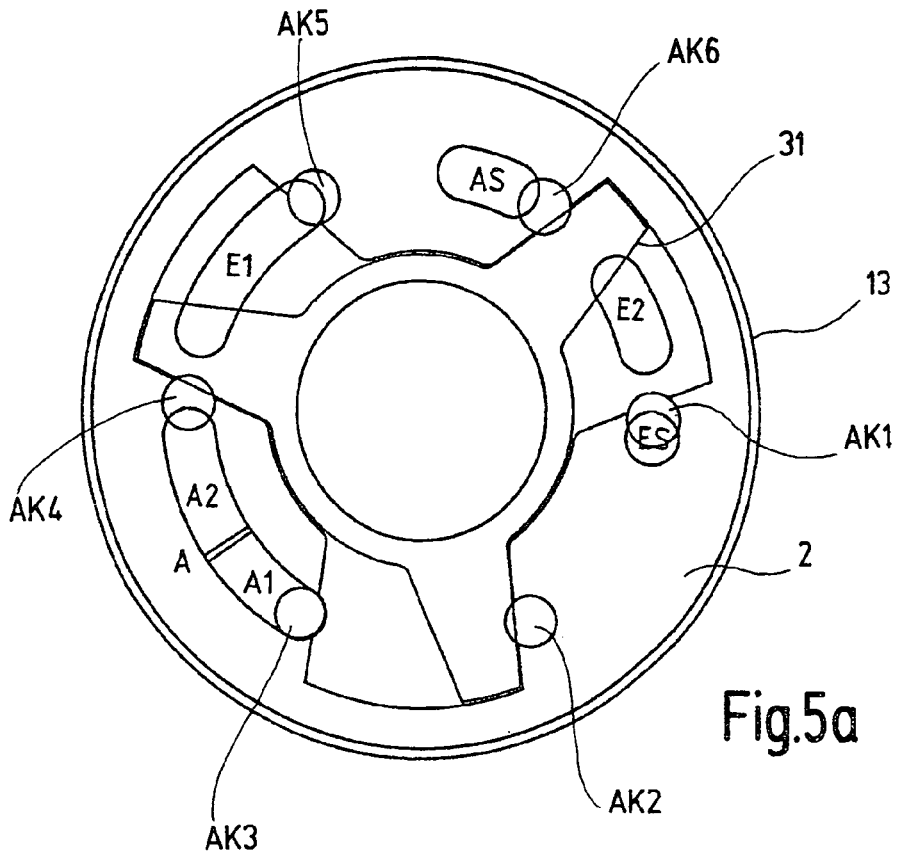
Figure 5B:
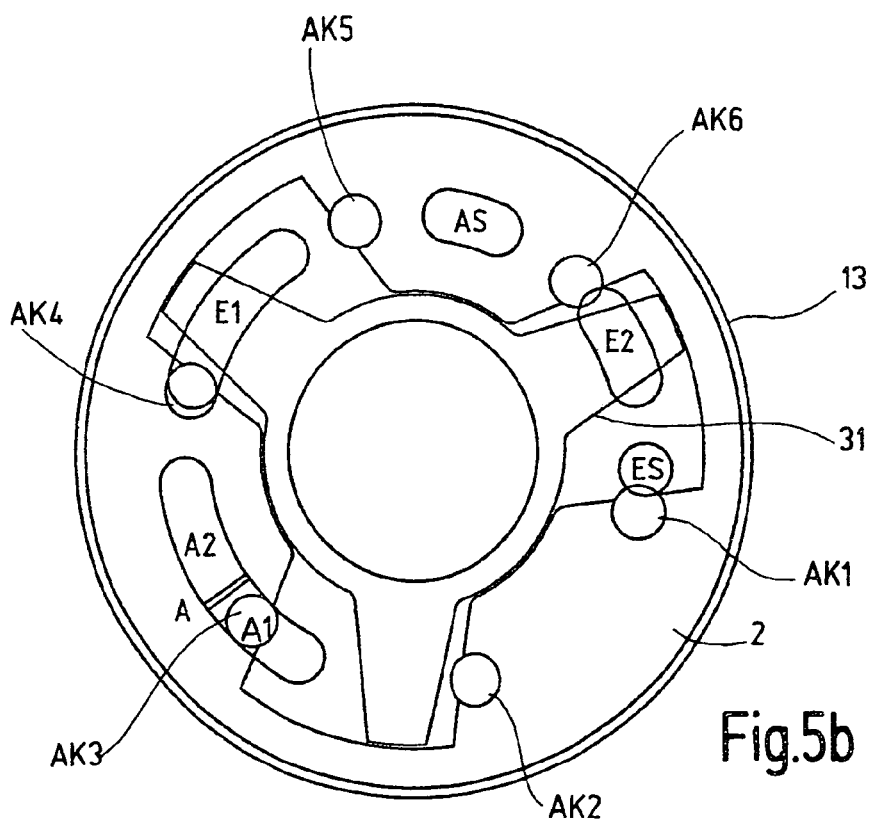
Figure 5C:
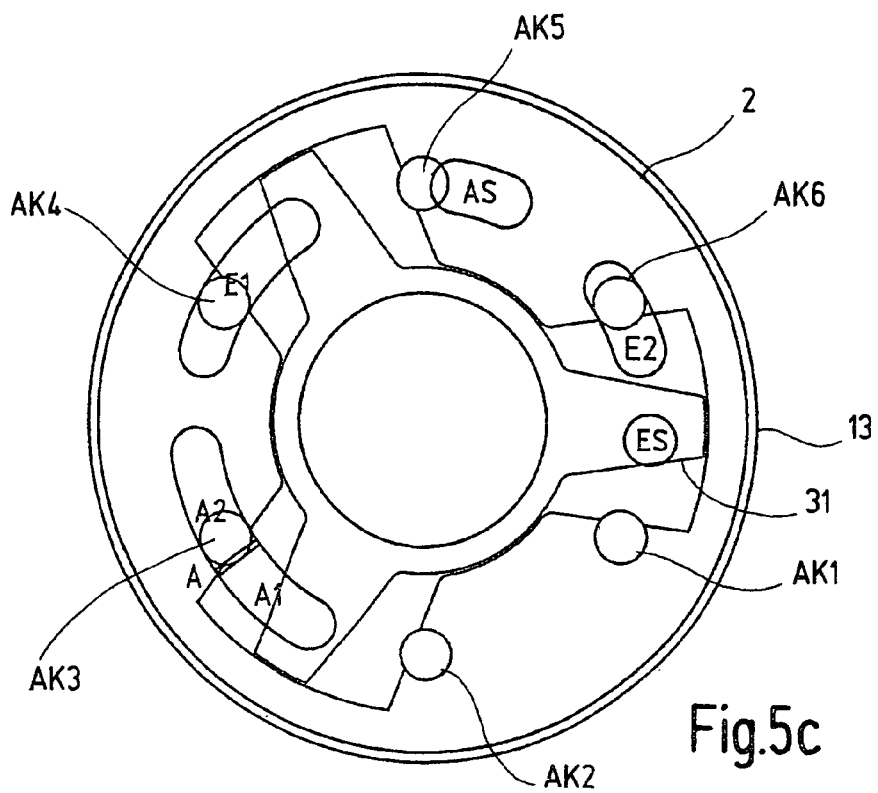
Figure 5D:
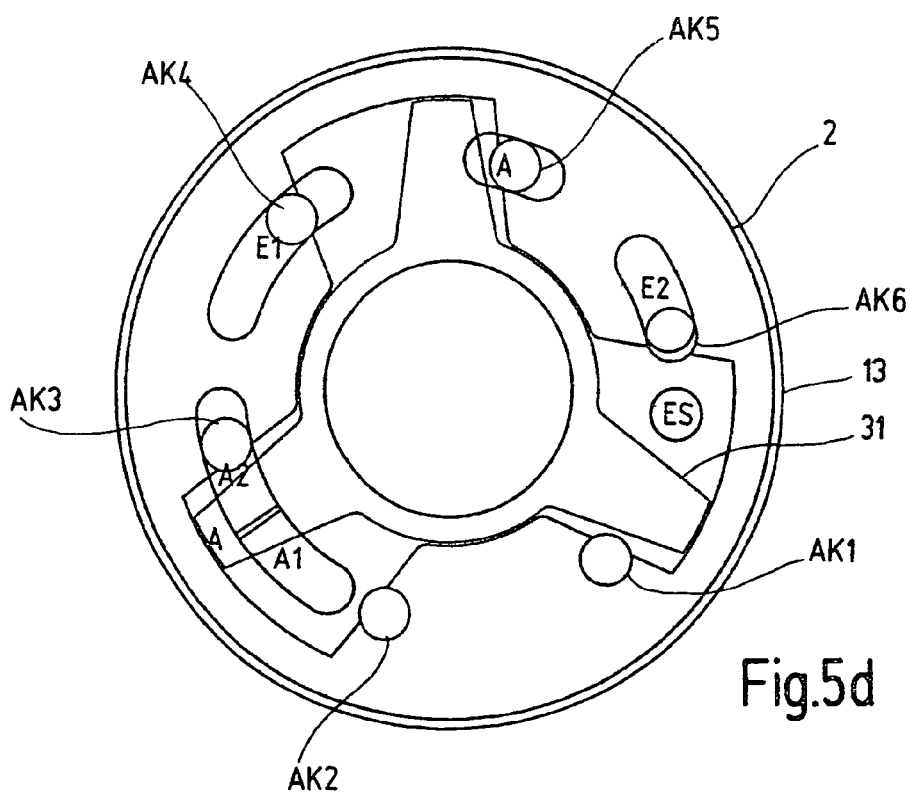
Figure 5E:
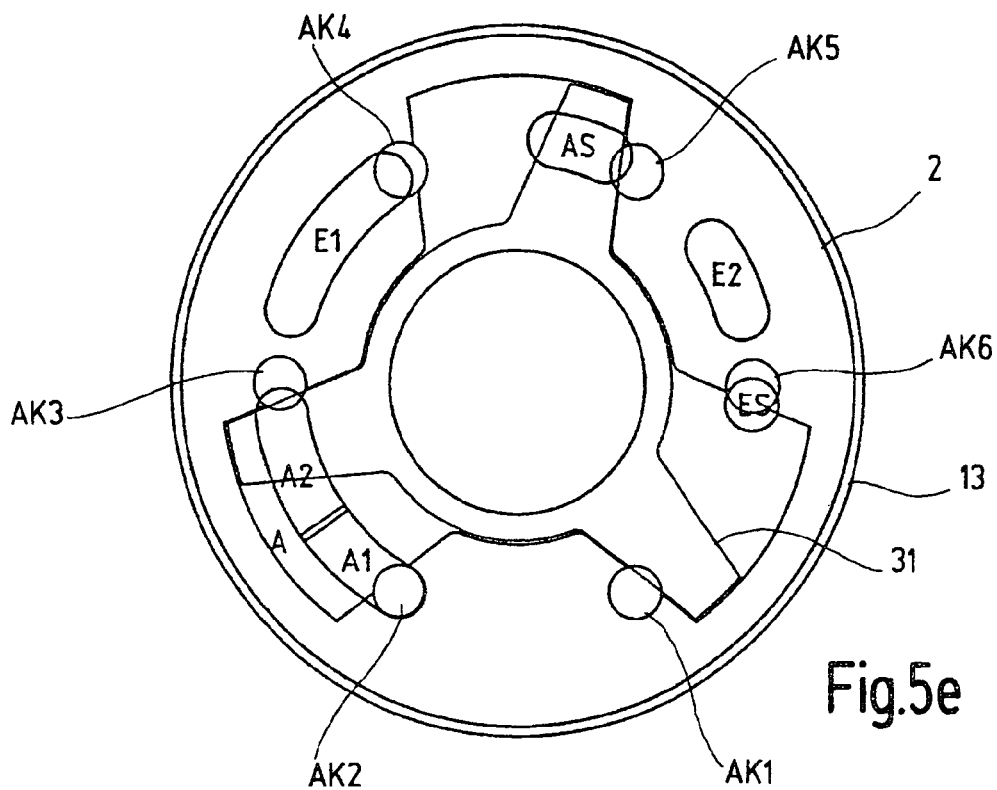

The position shown in FIG. 5a is defined as the 0° position. AK1 overlaps here with the control window ES. The latter communicates with an accumulator which has previously been charged with air or mixture (the charging of the accumulator is explained in more detail below). The charging air can flow into the space AK1 filled beforehand with an air/fuel mixture until the overlap of AK1 and ES ends and therefore interrupts the connection to the accumulator. This state is almost reached in FIG. 5b. At the same time as the charging process, the opposing piston which is associated with AK1 moves from its position near to AK6 in the direction AK1. As a result, the volume associated with AK1 is compressed. In the position shown in FIG. 5d, the mixture compressed in AK1 is ignited while there is still residual compression, corresponding to the ignition before the top dead center in conventional spark ignition engines. The combustion gases are burnt and expanded, FIGS. 5e and 5f, as a result of which the opposing piston is forced away from AK1 (working stroke). The further expansion of the combustion gases is illustrated in FIGS. 5g and 5h. As a result, the end of the column associated with AK1 in the table is reached.

As has been explained above, at first the column associated with AK3 in the table is to be used for the following strokes of AK1, and later the column associated with AK5. Consequently, it is now necessary to return to FIG. 5a and to consider AK3 there as a representative of AK1. Therefore, if for reasons of better orientation in the drawing, reference is then made to AK3, the processes are those which are decisive for AK1 in the further course of one full revolution of the external rotor 13.

The expansion of the combustion gases has taken place and AK3 now overlaps with the outlet region A1 of the outlet A through which the combustion gases, which are now to be referred to as exhaust gases, are expelled. The outlet A is divided by a web into the regions A1 and A2 so that, as is apparent from FIG. 5a, exhaust gases which are initially expelled via AK3 cannot pass to AK4, which at this point still just overlaps the region A2. AK3 then moves further along A1 and A2 and at the same time the associated opposing piston moves in the direction AK3 in order to expel the exhaust gases completely. This process is terminated in FIG. 5e.

Figure 5F:
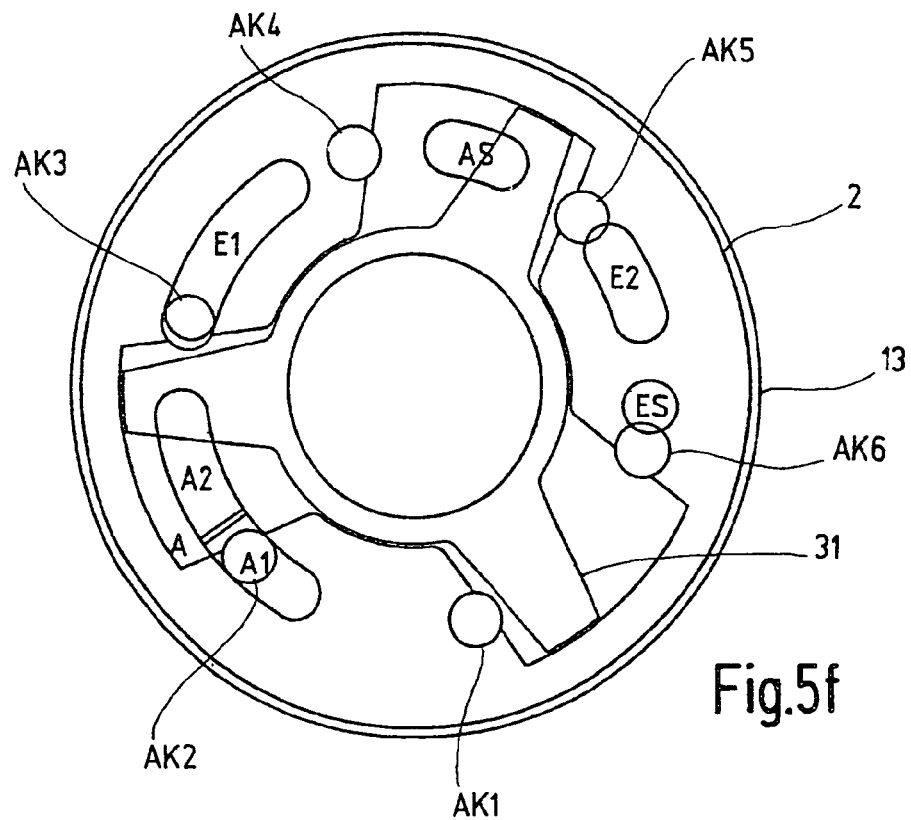
Figure 5G:
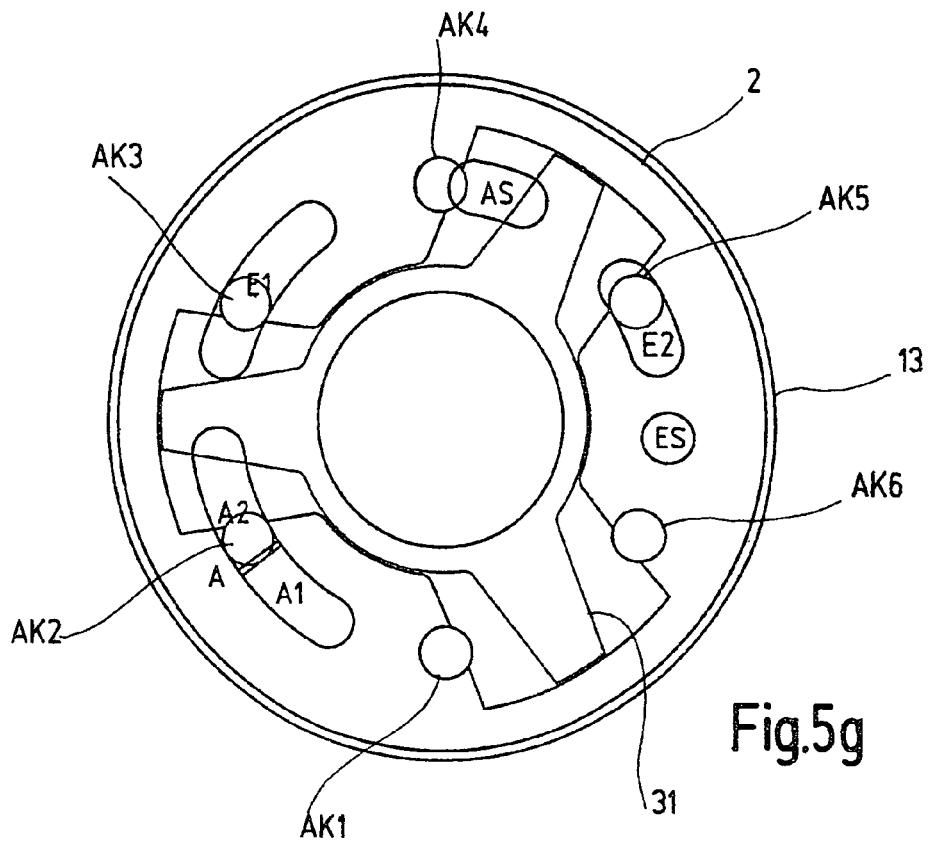
Figure 5H:
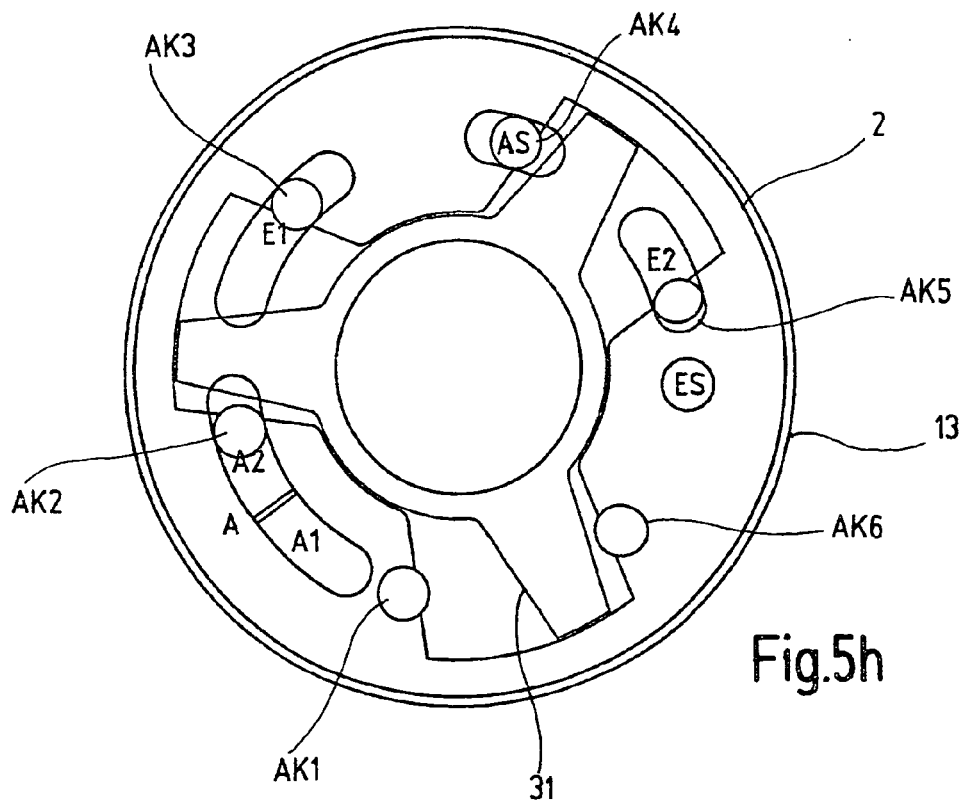

According to FIG. 5f, AK3 then moves into the overlapping region of the first inlet E1 for mixture or air, and the opposing piston moves away from AK3 again, as a result of which the induction stroke is initiated. This continues over FIGS. 5g and 5h. The space between AK3 and the opposing piston is now filled with mixture or air. In the table, the end of the column for AK3 is reached.

For further consideration, reference should be made to the column for AK5 in the table, with the proviso that the last third of the sequence of strokes for AK1 is now described, and in the text which follows AK5 is used only for reasons of better orientation in FIGS. 5a to 5f.

The overlapping of AK5 with E1 ends in the region which is not illustrated between FIGS. 5a and 5b. At the same time, the opposing piston moves again in the direction AK5 and compresses the previously sucked-in air or the previously sucked-in mixture. From FIG. 5c it is apparent that AK5 has now passed into the region which overlaps with the control window for the outlet AS to the accumulator. Said accumulator is charged by the further movement of the opposing piston in the direction of AK5. The charging process is terminated in the position shown in FIG. 5e.

AK5 now passes into the region which overlaps with the second inlet E2 for air or mixture, and the opposing piston moves away from AK5 in order to initiate a further induction stroke. The latter continues over FIGS. 5f and 5g until the inlet E2 in FIG. 5h closes again, i.e. moves outside the region of overlap between AK5 and E2. The end of the column for AK5 is therefore reached and the 360° cycle for AK1 is ended.

For the further profile regarding AK1, it is necessary to return to the start of the previous description of FIGS. 5a to 5h. The six strokes for AK1 can therefore be summarized as follows: supercharging of AK1 by the accumulator, compression and ignition, combustion and expansion, expulsion of the exhaust gases, induction of fresh air and fresh mixture, compression and charging of the accumulator, second induction of fresh air or fresh mixture.

The sequence of strokes for AK2 to AK6 can be considered in an analogous way, as a result of which an ignition sequence AK6, AK5, AK4, AK3, AK2, AK1 is obtained.

In FIG. 6, the bearing eyes of the connecting rods 33 are indicated by the unbroken circles 13', 31'. The internal, dot-dash circle 41 is the geometric location of the centers of the small bearing eyes during their rotation. The large outer dot-dash circle 42 is the geometric location of the centers of the eccentric shafts 32 which have the outer connecting rod bearings, while the small outer dot-dash circle 43 represents the eccentricity of the eccentric shafts 42. FIG. 6 shows how the available installation space is used by the dimensioning of the small and large bearing eyes of the connecting rods 33. The objective is to give the latter the largest possible dimensions in order to ensure sufficient load bearing capacity during the transmission of force, which takes place via the connecting rods 33, between the internal rotor 31 and the external rotor 13, in particular if the connecting rod journals 38 on the internal rotor 31 are composed, in one piece with the latter, from a lightweight metal alloy which has a lower strength value than, for example, steel. Of course, free access must still be ensured between adjacent connecting rods 33 and bearing eyes when the rotors 13, 31 rotate. It has become apparent that it is particularly favorable if the ratio of the radius of the large outer dot-dash circle 42 to the radius of the inner dot-dash circle 41 is approximately 2.5:1 to 3.5:1, and in particular approximately 3.0:1.

FIG. 7 shows a simplified longitudinal section which is analogous to FIG. 1, with a gearwheel oil pump which is arranged in the pistons 13a-c and the cooling oil guide means in the region of the opposing pistons being illustrated in more detail here. The gearwheel oil pump has essentially two cylinder-like gearwheels 70, 71 which are mounted in the upper and lower pump disks 72, 73. The gearwheel 70 is connected in a rotationally fixed fashion to the eccentric shaft 32, for example by means of a driver which compensates shaft offset, and as a result said gearwheel 70 is driven by said eccentric shaft 32. The gearwheel 71 is itself driven by the gearwheel 70. The cooling oil is transported into the intermediate spaces between the teeth along the outer circumference and cools the pistons in the process. The ingress of oil in the region of the insert 17 is indicated by the arrow 60. The oil passes through these bores 61 into the annular groove 62 (cf. FIG. 3c) which is countersunk in the region of three of the bores 39 and communicates therewith. The bore 39 is adjoined by four ducts 63 which extend obliquely parallel to one another in the opposing piston and which lead to the cooling pocket 46. Four corresponding ducts 64 lead back from the cooling pocket 46 to the three other bores 39 in the internal rotor 31, which bores 39 communicate with the annular groove 65. From there, the cooling oil then passes into the further oil circuit via the insert 17.

To summarize, the following is to be noted: the invention relates to a central-axis rotary piston internal combustion engine having a round cylindrical rotor housing 1 which is closed off by a housing cover 3 on the output side and a housing cover 2 on the side opposite the output side, an external rotor 13 which rotates at uniform speed in the rotor housing 1 about its central axis and which supports a rotor cover (12) on the output side and a rotor cover (15) on the side opposite the output side, and an internal rotor 31 which rotates at non-uniform speed in the interior of the external rotor 13 about the central axis, wherein the external rotor 13 has a plurality of radially inwardly pointing pistons which are rigidly connected to one another, and the internal rotor 31 has a corresponding number of radially outwardly pointing opposing pistons which are rigidly connected to one another and engage between, in each case, two pistons of the external rotor 13 so as to delimit two working chambers AK in each case, and wherein each working chamber AK is assigned a combustion chamber, and each combustion chamber communicates via a control window with fixed inlet openings and outlet openings. In order to improve the efficiency of the internal combustion engine, the invention proposes that the external rotor 13 should have three pistons 13a-c which are arranged at equal angular intervals from one another.

The invention claimed is:

1. A central-axis rotary piston internal combustion engine having a round cylindrical rotor housing which is closed off by a first housing cover on the output side and a second housing cover on the side opposite the output side, an external rotor which rotates at uniform speed in the rotor housing about its central axis and which supports a first rotor cover on the output side and a second rotor cover on the side opposite the output side, and an internal rotor which rotates at non-uniform speed in the interior of the external rotor about its central axis, wherein the external rotor has three external rotor pistons extending radially inwards and which are rigidly connected to one another, and the internal rotor has a corresponding number of internal rotor pistons extending radially outwards and which are rigidly connected to one another and engage between, in each case, two external rotor pistons of the external rotor so as to delimit two working chambers in each case, and wherein each working chamber is assigned a combustion chamber, and each combustion chamber communicates via a control window with fixed inlet openings and outlet openings, wherein the three external rotor pistons are arranged at equal angular intervals from one another, and wherein to implement a 6-cycle-process there are provided in at least one of the first and second housing covers, in the rotation direction of the three external rotor pistons, in succession a first inlet opening for air and fuel mixture, a first outlet opening to a gas accumulator, a second inlet opening for air and fuel mixture, a third inlet opening from the gas accumulator, and at least one second outlet opening.

2. The internal combustion engine as claimed in claim 1, wherein three connecting rod journals which are arranged at equal angular intervals are provided on the internal rotor, and
   wherein three connecting rods are mounted on the three Connected rod journals and are connected by their other ends to the external rotor via eccentric shafts.

3. The internal combustion engine as claimed in claim 2, wherein the centers of the three connecting rod journals are arranged at a distance from the central plane of a respective opposing piston of the three external pistons.

4. The internal combustion engine as claimed in claim 2, wherein the three connecting rod journals are embodied in one piece with the internal rotor.

5. The internal combustion engine as claimed in claim 2, wherein the three connecting rods have large undivided connecting rod eyes.

6. The internal combustion engine as claimed in claim 2, wherein an internal geared wheel, with which planet gears arranged on the eccentric shafts are in intermeshing engagement, is arranged on the rotor housing.

7. The internal combustion engine as claimed in claim 6, wherein the planet gears are embodied in one piece with the eccentric shafts.

8. The internal combustion engine as claimed in claim 6, wherein the central axis of the planet gears are offset parallel to the central axis of a connecting rod bearing part of the eccentric shafts.

9. The internal combustion engine as claimed in claim 6, wherein a ratio of radii of geometric locations of centers of the planet gears and of small connecting rod bearings of the three connecting rods is in the range from 2.5:1 to 3.5:1 as the internal and external rotors rotate.

10. The internal combustion engine as claimed in claim 2, wherein at least one oil pump, which is embodied as a gearwheel pump and whose drive gearwheel is connected to at least one of the eccentric shafts, is provided in the external rotor.

11. The internal combustion engine as claimed in claim 1, wherein the internal rotor is composed of an aluminum alloy.

12. The internal combustion engine as claimed in claim 1, wherein a sparkplug is arranged in each combustion chamber.

13. The internal combustion engine as claimed in claim 12, wherein each of the sparkplugs is arranged centrally in its combustion chamber.

14. The internal combustion engine as claimed in claim 12, wherein the sparkplugs are supplied with electrical energy via a spark gap which extends from the rotor housing to the external rotor.

15. The internal combustion engine as claimed in claim 12, wherein the external rotor is electrically insulated at the circumference.

16. The internal combustion engine as claimed in claim 1, wherein the second housing cover is an upper housing cover, and
wherein a sparkplug, which is responsible for igniting the mixture in all the combustion chambers, is arranged in the second housing cover.

17. The internal combustion engine as claimed in claim 1, wherein an oil pump which is embodied as a gearwheel pump is provided in each of the three external pistons of the external rotor.

18. The internal combustion engine as claimed in claim 1, wherein an essentially annular oil collecting trough for lubricating and/or cooling oil is arranged coaxially with respect to the central axis of the internal and external rotors.

19. A method for operating the internal combustion engine as claimed in claim 1, comprising the following steps:
a) intake of a charge into a first working chamber of the working chambers via the first inlet opening for air and fuel mixture, the charge comprising the fuel and air mixture;
b) precompression of the charge in the first working chamber and compression of the charge into the gas accumulator via the first outlet opening to the gas accumulator;
c) intake of further charge into a second working chamber of the working chambers via the second inlet opening for the air and fuel mixture, the further charge comprising further fuel and air mixture, and addition of the charge from the gas accumulator into the second working chamber via the third inlet opening from the gas accumulator to form a combined charge;
d) compression of the combined charge in the second working chamber and ignition and combustion of the compressed combined charge in the second working chamber;
e) expansion of the combined charge in the second working chamber to form combustion gases; and
f) expulsion of the combustion gases from the second working chamber via the at least one second outlet opening.

20. The method as claimed in claim 19, wherein a charge cycle takes place via axially arranged control openings.

* * * * *

UNITED STATES PATENT AND TRADEMARK OFFICE
CERTIFICATE OF CORRECTION

PATENT NO. : 8,534,259 B2  
APPLICATION NO. : 12/311566  
DATED : September 17, 2013  
INVENTOR(S) : Eckhardt et al.

Page 1 of 1

It is certified that error appears in the above-identified patent and that said Letters Patent is hereby corrected as shown below:

In the Claims

In Column 10, line 43 (line 5 of Claim 2) please change "Connected" to: --connecting--.

Signed and Sealed this  
Sixth Day of May, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,534,259 B2 Page 1 of 1
APPLICATION NO. : 12/311566
DATED : September 17, 2013
INVENTOR(S) : Eckhardt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this
Fifteenth Day of September, 2015

Michelle K. Lee
*Director of the United States Patent and Trademark Office*